United States Patent [19]

Fucci

[11] Patent Number: 4,700,544

[45] Date of Patent: * Oct. 20, 1987

[54] COMBUSTORS

[75] Inventor: Robert C. Fucci, Jupitor, Fla.

[73] Assignee: United Technologies Corporation, Hartford, Conn.

[ * ] Notice: The portion of the term of this patent subsequent to Nov. 18, 2003 has been disclaimed.

[21] Appl. No.: 689,220

[22] Filed: Jan. 7, 1985

[51] Int. Cl.[4] ............................ F02C 1/00; F02G 3/00
[52] U.S. Cl. ...................................... 60/757; 60/759
[58] Field of Search ............... 60/752, 755, 757, 759, 60/756, 758, 760

[56] References Cited

FOREIGN PATENT DOCUMENTS 665155 1/1952 United Kingdom ................. 60/757
858525 8/1958 United Kingdom ................. 60/757

Primary Examiner—Louis J. Casaregola
Assistant Examiner—Timothy S. Thorpe
Attorney, Agent, or Firm—Norman Friedland

[57] ABSTRACT

A refilmer for placing the film of cool air impeded by combustion/dilution air holes of a combustor for a gas turbine engine includes a grommet with a lip extending axially in the combustion chamber. The outer side wall of the grommet is recessed in the area overlying the lip so that when assembled, it forms a gap with the liner exposing the lip to cool air for forming the film. Tabs on the cool air side prevent the grommet from falling into the combustion chamber. The aperture in the grommet is oriented to direct the combustion/dilution air stream at a relative angle to the flow of combustion products. Indexing surfaces on the grommet fixture locates the grommet to the liner prior to being welded into place.

4 Claims, 4 Drawing Figures

COMBUSTORS

The Government has the rights in this invention pursuant to Contract No. F33657-82-C-0122 awarded by the Department of the Air Force.

Cross Reference

This invention is related to the inventions disclosed in copending patent applications Ser. Nos. 689,218 and 689,253, now U.S. Pat. No. 4,622,821 entitled INTEGRAL REFILMER LIP FOR FLOATWALL PANELS and COMBUSTION LINER FOR A GAS TURBINE ENGINE, filed by Harold G. Reynolds and Thomas J. Madden, respectively on even date and both assigned to the same assignee of this application.

Description

1. Technical Field

This invention relates to gas turbine engine combustors and particularly to means for restarting the cooling film downstream of combustion/dilution holes.

2. Background Art

As is well known, the combustor liner has historically been susceptible to cracking occasioned by the high thermal stress to which it is subjected. The area around the combustion/dilution holes in the liner have generally been one of the more crucial areas because the dilution/combustion air which is admitted radially into the combustor destroys the cooling film which is typically created by the louver liner design. An example of such a system where the liner is formed to create a film is the double loop louver liner utilized in turbine type power plants such as the JT9D, PW-2037 and F-100 engines and the like, manufactured by Pratt & Whitney Aircraft of United Technologies Corporation, and described and claimed in U.S. Pat. No. 4,380,906 granted to J. A. Dierberger on Apr. 26, 1983 and assigned to the same assignee as this patent application.

DISCLOSURE OF INVENTION

An object of this invention is to provide an improved means for regenerating the cooling film downstream of the combustion/dilution holes of the combustor of a turbine type of power plant. A feature of this invention is to include in a grommet the restarting film generating means by providing a recessed portion along the downstream face of the outer wall of the grommet. Another feature is to orient the dilution/combustion air hole in the grommet to impinge on the combustion airstream at a predetermined angle. A still further feature of the invention is to provide means on the grommet to align the grommet relative to the combustor liner and the air passage so that the air impinges on the flow stream of the combustion products at a predetermined angle. And a still further feature of this invention is to provide tabs in the grommet to assure that the grommet doesn't inadvertently fall into the combustion airstream in the event of becoming dislodged.

Other features and advantages will be apparent from the specification and claims and from the accompanying drawings which illustrate an embodiment of the invention.

BEST MODE FOR CARRYING OUT THE INVENTION

Figure 1:
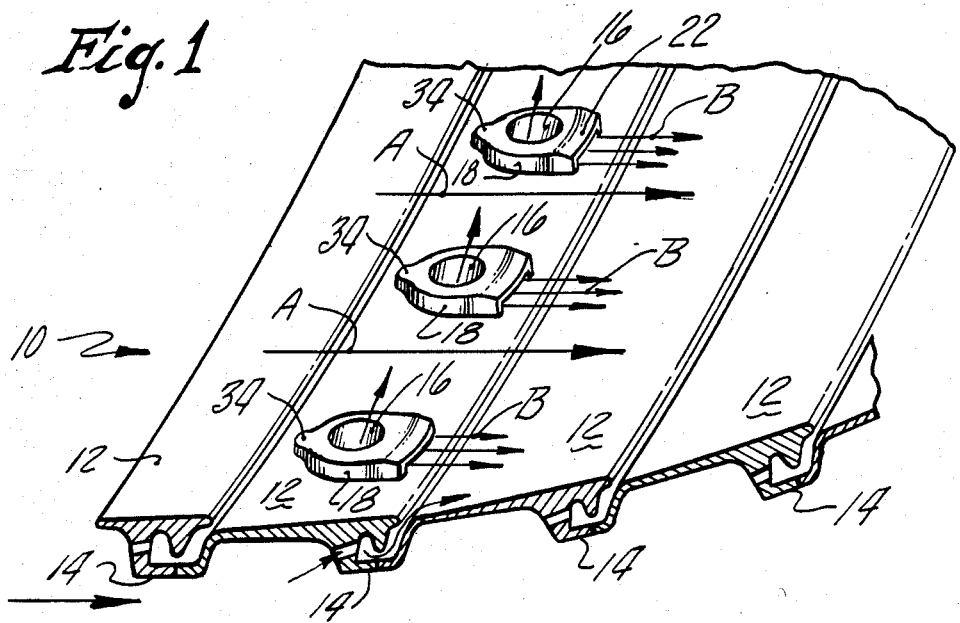
FIG. 1 is a partial view of the liner of the combustor with the refilmer of this invention mounted in the air dilution/combustion.

As can be seen from FIG. 1, the preferred embodiment of this invention is shown as being utilized on a louvered liner of the combustor of a gas turbine engine of the type described and claimed in U.S. Pat. No. 4,380,906, supra. Suffice it to say that cooperating liners are concentrically mounted about the axes of the engine and together define the annular combustion chamber. The hot combustion gases which constitute the engine's working medium are generated in the combustion chamber and flow in the direction indicated by arrow A. The liner generally indicated by reference numeral 10 comprises a plurality of annular louver panels 12 that are mounted end to end to define the combustion chamber. Each panel at the upstream end carries a double pass loop film generator 14 that takes cooler air from the outside surface generated from the engine's compressor section (not shown) which is directed into a cavity shrouding the combustor liner and forms a cooling film adjacent the inner surface of each of the louver panels. Obviously, the cooling film serves to protect the liner from the hostile environment and enhances the durability of the material.

As noted above, combustors require combustion/dilution air which are admitted radially in the combustion zone at predetermined axial and circumferential locations. The three combustion/dilution air holes are merely representative and only one will be described for the sake of convenience and simplicity.

As noted in FIGS. 1-4, a grommet 18 is fitted into the combustion/dilution air holes and serves to form a film downstream of the grommet as indicated by the arrows B. This generates a refilmer that replaces the film that would otherwise be there had not such film been destroyed by the radial flow of the combustion/dilution air stream.

Figure 3:
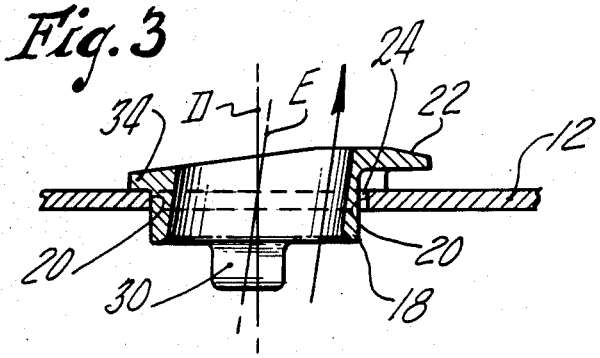
FIG. 3 is a sectional view taken along lines 3—3 of FIG. 2.
Figure 2:
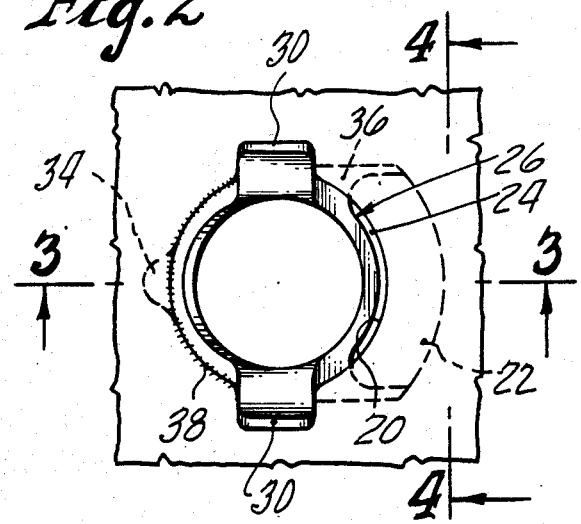
FIG. 2 is a partial bottom view showing one of the refilmers.
Figure 4:
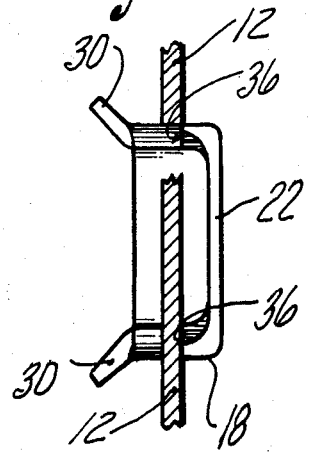
FIG. 4 is a sectional view taken along lines 4—4 of FIG. 3.

Grommet 18 fits into a complimentary hole 20 formed in the liner, and as is apparent from FIG. 3, the diameter of the hole and the outer diameter of the grommet are substantially the same, providing as close a fit as within the manufacturing tolerances. An axial protruding lip 22 is formed on the downstream side of the grommet (relative to the direction of the cool air film stream) and spans the two quadrants of the circular section as shown. The outer diameter of grommet 18 is recessed or undercut to define an accurately shaped gap 24 between the grommet 18 and the hole 20 of the liner. This allows cooler air from the outer surface of the liner 2 to flow radially inwardly to impinge on the inner surface of lip 22 to turn and form the cooling film. Inasmuch as the recess 26 is formed integrally with the grommet as by casting, the machining operation that would otherwise be necessary to obtain the refilming cooler air is eliminated.

As noted in FIG. 3, the centerline of the liner indicated by the line D and the centerline of the bore of the grommet indicated by line E are angularly disposed relative to each other. This serves to direct the flow stream of the combustion/dilution air into the combustor at a predetermined angle and serves to assure that the stream of the combustion/dilution air doesn't adversely affect the flow of the combustion gases. Obviously, since the hole is integrally casted into the grommet, it can be made at any angle desired.

A pair of tabs 30 extending from the wall of grommet 18 on the cool side of the grommet (the side exposed to the cooler compressor discharge air) serves to assure that the grommet doesn't fall into the combustion section in the event the assembly becomes dislodged. Once installed, by inserting the grommet 18 into the hole 20, tabs 30 are bent outwardly.

To orient the lip 22 so as to lie substantially parallel with the inner surface of liner 12 the grommet 18 carries its own self-aligning means which comprises projection 34 and the two opposing side walls 36 formed on the outer diameter of grommet 18. The height of these 3 elements (projection 34 and the two side walls 36) define a surface that bears against the inner surface of louver panel 12. To assemble, the grommet is inserted in the hole 20 until it bears against the upper surfaces of projection 34 and the two side walls 36. This inherently aligns the grommet in its horizontal plane. The position of the lip is adjusted by the operator and the assembly is welded to the liner as indicated by the weld 38. Tabs 30 are then bent outwardly as described above.

As is apparent from the foregoing, the refilmer is characterized as being relatively simple and eliminates subsequent manufacturing steps that have to be carried out in heretofore known refilmers. This invention includes among other features, a self-fixturing feature, an integral combustion/dilution air hole whose angle can be varied and the gap that determines amount of restart film cooling air is cast in the grommet assuring that this gap can be closely controlled.

It should be understood that the invention is not limited to the particular embodiments shown and described herein, but that various changes and modifications may be made without departing from the spirit and scope of this novel concept as defined by the following claims.

I claim:

1. For a liner for a combustion chamber of a gas turbine engine having the products of combustion on the inner surface of the liner and cooler air on the outer surface of the liner, means for generating a film of cool air by directing the cooler air internally to flow adjacent the inner surface of the liner, combustion/dilution air holes in said liner flowing cooler air into the combustion chamber impeding said film, refilmer means for generating a film of cooler air downstream of said combustion/dilution hole relative to the flow of the combustion products, said refilmer including a grommet extending through a circular opening formed in said liner and having an outer diameter substantially equal to the diameter of said circular opening, an axially extending lip on one end of said grommet circumferentially extending 180° around said grommet, the outer wall of said grommet contiguous with said lip being recessed to define a gap between the liner and grommet for leading cooler air from the outer surface of said liner to impinge on said lip and form a film of cooler air directed adjacent the inner surface of said liner, means for attaching said grommet to said liner, spacer means on said grommet to space said lip radially from the inner surface of said liner and an opening in said grommet defining said combustion/dilution air hole.

2. For a liner as in claim 1 wherein the combustion/dilution opening formed in said grommet is angularly oriented with respect to the complementary circular opening formed in said liner so that the stream of combustion/dilution air flowing radially therein joins the stream of combustion products at a predetermined angle.

3. For a liner as in claim 1 wherein said grommet includes at least a pair of bendable tabs extending axially from the edge of said grommet so as to be bent radially outward adjacent the outer surface of said liner to prevent the grommet from falling into the combustion chamber.

4. For a liner as in claim 3 including a projection extending radially from the bottom edge of said grommet having an upper surface, and a pair of circumferentially spaced side projections on the opposite end of said grommet, each having an upper surface, each of said upper surfaces falling in a given plane to bear against said inner surface to orient said grommet relative to said liner and supporting said grommet to said liner.

* * * * *